Jan. 10, 1950 S. MARAS 2,493,888
TRACTOR HITCH
Filed Nov. 25, 1946 2 Sheets-Sheet 1
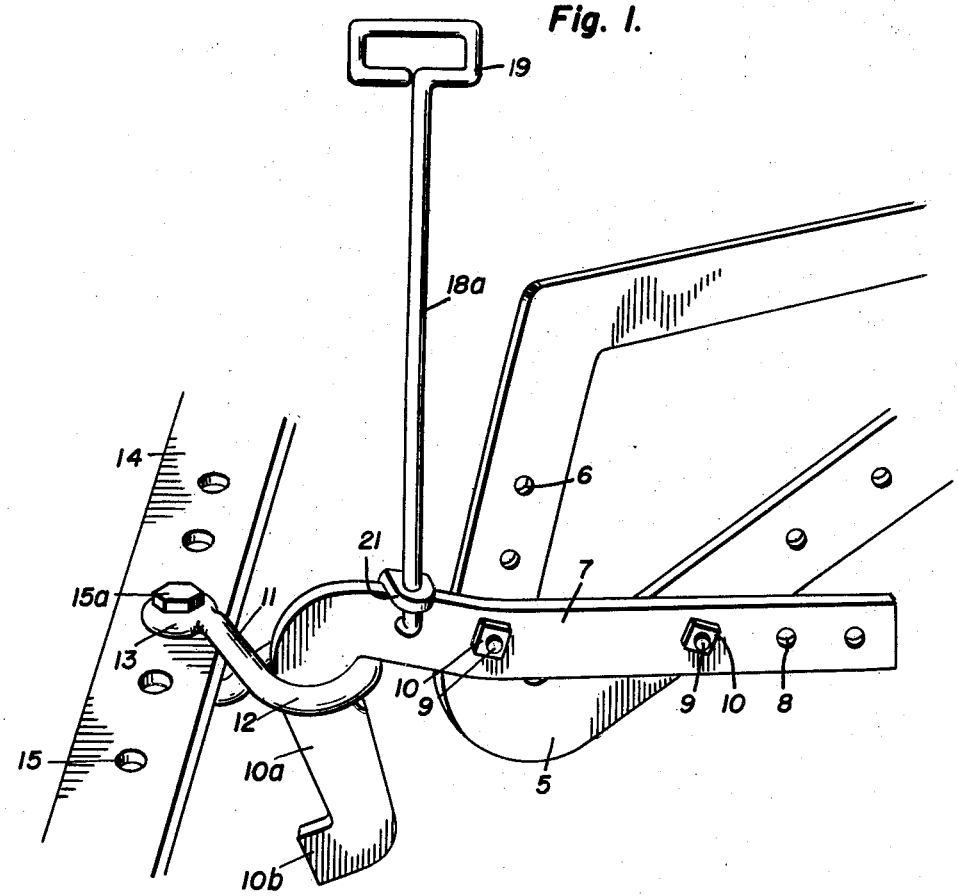
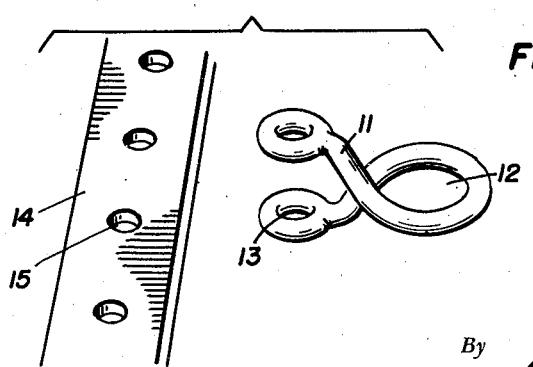
Inventor
Steve Maras
By *Clarence A. O'Brien and Harvey B. Jacobson*
Attorneys Jan. 10, 1950     S. MARAS     2,493,888
TRACTOR HITCH Filed Nov. 25, 1946     2 Sheets-Sheet 2

Inventor
Steve Maras

By *Clarence A. O'Brien and Harvey B. Jacobson*
Attorneys

Patented Jan. 10, 1950

2,493,888

UNITED STATES PATENT OFFICE 2,493,888

TRACTOR HITCH

Steve Maras, Jackson, Minn.

Application November 25, 1946, Serial No. 712,176

3 Claims. (Cl. 280—33.15)

This invention relates to new and useful improvements in a tractor hitch and more particularly to a device attached to farm implements for conveniently hitching or unhitching said farm implement to a tractor.

Another important feature of this invention is to provide a device of this character that will allow the tractor operator to attach a farm implement to the tractor without getting off the tractor, and without the assistance of another person.

A further important feature of this invention is to provide a device of the character referred to that will disconnect the farm implement from a tractor when said tractor wheels are turned too sharp thereby eliminating any entanglement of the farm implement with the tractor wheels.

A still further feature is to provide a device of this character that is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the invention attached to a farm implement and engagingly connected to a tractor.

Figure 3 is a group perspective view of the tractor draw bar (shown in part) and the draw bar clevis carried by said bar for attaching the invention to the tractor.

Figure 2:
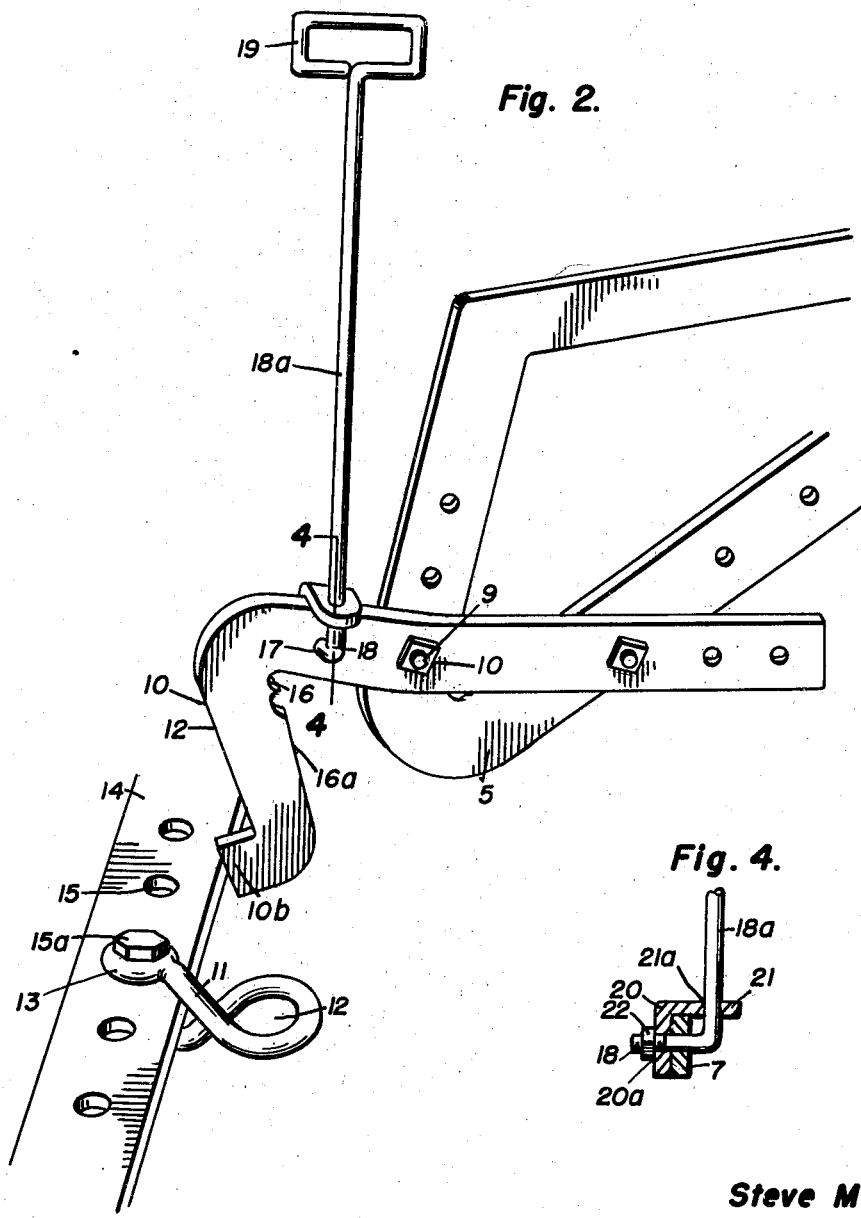
Figure 2 is a perspective view of the invention in disengaged position.

Referring now to the drawings in detail, wherein, for the purpose of illustration, I have disclosed a preferred embodiment of the invention, the numeral 5 represents the lower end of a conventional drill hitch carried by a farm implement (not shown), said hitch having conventional holes 6 punched therein.

A shank 7 having holes 8 is attached to said hitch by conventional bolts 9 and nuts 10 which are placed through holes 8 in the shank and holes 6 in the hitch. Needless to say the shank may be attached to said hitch so that it may be inclined in any desired position by merely placing said bolts and nuts in different holes in the hitch, as shown in Figure 1, or the shank may be welded or otherwise permanently secured to the hitch.

The forward portion of shank 7 is formed into a hook 10a whose lower end 10b is formed into a forwardly projecting extension.

A wire clevis 11 is bent into a loop 12, the ends of said clevis 11 being formed into a pair of eyes 13 that are spaced apart and in alignment with each other. The eyes 13 are positioned on opposite surfaces of a tractor draw bar 14 and over holes 15 punched in said draw bar. Extending through eyes 13 and hole 15 and holding clevis 11 onto draw bar 14 is a conventional bolt and nut 15a.

Hook 10a is placed in loop 12 and is held therein as the tractor moves forwardly by seating the loop in a notch 16 formed at the upper inner edge 16a of the bill portion of the hook. The forwardly projecting extension 10b of hook 10a prevents the hook from slipping out of engagement with clevis 11 as the tractor is backed up toward the drilled hitch 5 carried by the farm implement.

Extending through shank 7, and near the hook end of said shank, is a hole 17 adapted to receive the horizontally bent threaded end 18 of an upwardly extending rod 18a, said rod being formed at its upper end into a handle grip 19.

Figure 4:
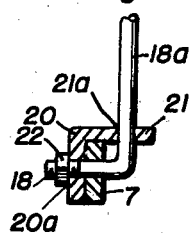
Figure 4 is a sectional view taken on line 4—4 of Figure 2.

An angle bracket 20 includes an apertured vertical end 20a positioned against one side of the shank 7 to receive the horizontal end 18 of the rod 18a, said end of the rod having a nut 22 threaded thereon. The bracket also includes a horizontal apertured end through which the rod 18a extends vertically to retain said rod in a vertical position as shown in Figure 4, when nut 22 placed on end 18 is tightened.

The tractor operator may easily engage hook 10a in clevis 11 by merely gripping handle 19 and lowering said hook into the loop end 12 of said clevis. The operator can do this without stepping down from the tractor. If the operator desires to disengage hook 10a from clevis 11 he merely pulls upwardly on handle 19.

Should the tractor operator turn the tractor wheels (not shown) at too sharp an angle hook 10a will slip out of loop 12 formed at the forward end of clevis 11, thereby preventing the wheels of the tractor from becoming entangled with the farm implement carrying the hitch 5.

In view of the foregoing description taken in conjunction with the accompanying drawings it is believed that a clear understanding of the construction, operation and advantage of the device will be quite apparent to those skilled in this art.

A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim:

1. In combination with a hitch carried by a farm implement, a shank having a plurality of apertures that selectively oppose apertures provided in the hitch, fasteners removably engaging opposing apertures for retaining the shank at a selected inclined position relative to the hitch, a downwardly extending hook integrally formed at one end of the shank, a notch formed on the upper inner edge of the bill portion of said hook, a clevis carried by a tractor hitch engageable in said notch, and an integral stop plate carried by the hook normally engaged under the clevis.

2. In combination with a hitch carried by a farm implement, a shank, means for securing said shank at selected inclined positions relative to the hitch, a downwardly extending hook at one terminal of said shank, said hook having an upper inner edge, a notch provided in the upper inner edge of said hook, and a clevis carried by a tractor hitch engageable in said notch, said hook having a forwardly projecting extension engaged under said clevis to prevent disengagement of said hook from said clevis during rearward movement of the tractor.

3. The combination of claim 1 and handle means rising from said hook.

STEVE MARAS.

REFERENCES CITED

The following references are of record in the file of this patent:

UNITED STATES PATENTS

| Number | Name | Date |
|---|---|---|
| 605,656 | Taylor | June 14, 1898 |
| 1,181,877 | Hanson | May 2, 1916 |
| 1,462,921 | Reichmann | July 24, 1923 |
| 1,755,164 | Bentley | Apr. 22, 1930 |
| 2,039,689 | Tade | May 5, 1936 |
| 2,399,364 | Lewison | Apr. 30, 1946 |

FOREIGN PATENTS

| Number | Country | Date |
|---|---|---|
| 110,043 | Great Britain | Oct. 11, 1917 |